US011934315B1

(12) United States Patent
Gould

(10) Patent No.: US 11,934,315 B1
(45) Date of Patent: *Mar. 19, 2024

(54) CONTROLLED ACTIVATION OF INTERDEPENDENT BINDINGS

(71) Applicant: Inductive Automation, LLC, Folsom, CA (US)

(72) Inventor: Carl Reuben Gould, Folsom, CA (US)

(73) Assignee: Inductive Automation, LLC, Folsom, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/472,226

(22) Filed: Sep. 22, 2023

Related U.S. Application Data

(63) Continuation of application No. 17/969,621, filed on Oct. 19, 2022, now Pat. No. 11,803,478.

(51) Int. Cl.
| | |
|---|---|
| *G05B 13/04* | (2006.01) |
| *G05B 19/05* | (2006.01) |
| *G06F 8/38* | (2018.01) |
| *G06F 12/0862* | (2016.01) |
| *G06F 16/901* | (2019.01) |
| G06Q 10/0639 | (2023.01) |
| H04N 19/12 | (2014.01) |

(52) U.S. Cl.
CPC ....... *G06F 12/0862* (2013.01); *G05B 19/058* (2013.01); *G06F 8/38* (2013.01); *G06F 16/9024* (2019.01); *G06F 16/9027* (2019.01); *G05B 19/05* (2013.01); *G05B 2219/13144* (2013.01); *G05B 2219/14083* (2013.01); *G06Q 10/0639* (2013.01); *H04N 19/12* (2014.11)

(58) Field of Classification Search
CPC .... G06F 16/9027; G06F 16/9024; G06F 8/38; G06F 12/0862; G05B 19/058
See application file for complete search history.

(56) References Cited

U.S. PATENT DOCUMENTS

| | | | |
|---|---|---|---|
| 10,275,265 | B1 | 4/2019 | Gould et al. |
| 2006/0242002 | A1 | 10/2006 | Sun et al. |
| 2009/0132636 | A1 | 5/2009 | Natanzon et al. |
| 2014/0313215 | A1 | 10/2014 | Woods |

FOREIGN PATENT DOCUMENTS

| | | |
|---|---|---|
| CN | 101606122 B | 12/2009 |
| CN | 105303465 A | 2/2016 |
| CN | 108319483 A | 7/2018 |
| WO | WO 2020/119485 A1 | 6/2020 |

OTHER PUBLICATIONS

United States Office Action, U.S. Appl. No. 17/969,621, filed May 30, 2023, 22 pages.
United States Office Action, U.S. Appl. No. 17/969,621, filed Feb. 16, 2023, 20 pages.

*Primary Examiner* — Tuan A Vu
(74) *Attorney, Agent, or Firm* — Fenwick & West LLP

(57) ABSTRACT

A system for efficiently configuring bindings based on a dependency graph is described. The system may generate or access a graph comprising a set of nodes. Each node may represent a binding and is associated with a component property of a component hierarchy corresponding to a hierarchical structure of a data model. Each node of the graph may be connected to at least one other node with an edge representing a dependency in the hierarchical structure of the data model. The system may receive a request to generate a view associated with the set of bindings. The system may determine an order to load the set of bindings based on the graph, and may load the set of bindings based on the determined order.

20 Claims, 9 Drawing Sheets

800

Accessing a graph comprising a set of nodes, each node representing a binding and associated with a component property of a component hierarchy corresponding to a hierarchical structure of a data model, wherein each node is connected to at least another node of the set of nodes with an edge representing a dependency in the hierarchical structure of the data model
810

Receiving a request to generate a view associated with the set of bindings
820

Determining an order to load the set of bindings based on the accessed graph and based on the hierarchical structure of the data model
830

Loading the set of bindings based on the determined order
840

FIG. 8

CONTROLLED ACTIVATION OF INTERDEPENDENT BINDINGS

CROSS REFERENCE TO RELATED APPLICATIONS

This application is a continuation of U.S. application Ser. No. 17/969,621, filed Oct. 19, 2022, now U.S. Pat. No. 11,803,478, which is incorporated by reference in its entirety.

FIELD OF ART

This disclosure relates generally to computer software, and in particular controlling industrial processes using data bindings to hierarchical structures of data values.

BACKGROUND

Description of Art

Industrial processes can produce a great deal of useful and important data related to the states and conditions of associated machines and other data production sources. For example, it is advantageous for a manager of a factory to be able to monitor the state of a pump, oven, or pipeline remotely without the need to inspect the entity in person. Software that allows users to view information about different components related to an industrial process can thus be useful. However, the condition of one machine or component may depend on other machines or components which may further have additional dependencies. Initiating a machine or component representation within an interface without configuring or waiting for results returned from the machines or components on which the initiated machine or component depends may yield false results, particularly upon initialization or startup.

SUMMARY

A system provides an interface for designing and implementing graphical user interfaces that users may be able to monitor and control many components of industrial processes from clients such as computer devices like smartphones, tablets, desktop computers, laptop computer, and the like. The design interface includes functionality for selecting preprogrammed components, or for generating new components for display. The design interface further makes it possible for designers to associate data values received from a variety of sources with properties of the components in the user interfaces. In particular, properties associated with a component of an interface are stored in property tree structures, enabling a user or process to make dynamic changes to the components. Data bindings between subtrees representing components and sets of data from industrial and other sources allows for designs that scale with the availability of the data.

Data bindings may have dependent relationships with each other. For example, configuring a first binding may require outputted results from another binding. However, each binding may be configured independently without being aware of the status of other bindings, which may cause dependent bindings to produce false values (e.g., null state, empty string, zero values, etc.).

The system described herein may generate and access a dependency graph before initiating bindings. The system may analyze dependencies within the graph and may generate a DAG (directed acyclic graph, or simply "graph") comprising nodes that represent bindings and edges that represent references to properties of other bindings. The system may generate the graph by first identifying a first set of nodes (or bindings) that do not depend on any other bindings. Then the system may identify a second set of nodes that are directly connected to the first set of bindings. The system continues to identify dependent bindings until all the bindings that the target binding depends on are included in the dependency graph. The system may then initiate the configuration of the bindings based on the dependency graph. The system may further take into account the lag in timing when initiating the configurations, such that the system may wait until all the results needed for initiating a binding are ready before initiating the binding.

Existing implementations may initiate bindings in random order because the bindings are not aware of each other. Configuring bindings in random order may cause a specific binding to initiate prior to the bindings that the specific binding depends on having produced valid results. The specific binding may take the invalid results as input and further produce false results, which causes inefficiency and creates processing and network load unnecessarily. The system provides a solution and improves efficiency by first generating and analyzing a dependency graph before initiating binding configurations. The system may further take into account an estimated lag before configuring each binding by initiating dependent bindings only after the bindings on which they depend have produced valid results.

The features and advantages described in this summary and the following detailed description are not all-inclusive. Many additional features and advantages will be apparent to one of ordinary skill in the art in view of the drawings, specification, and claims hereof.

BRIEF DESCRIPTION OF THE DRAWINGS

FIG. 8 is a flowchart illustrating a process of establishing a data binding based on a dependency graph, in accordance with one or more embodiments.

The figures depict an embodiment of the invention for purposes of illustration only. One skilled in the art will readily recognize from the following description that alternative embodiments of the structures and methods illustrated herein may be employed without departing from the principles of the invention described herein.

DETAILED DESCRIPTION

Figure 1:
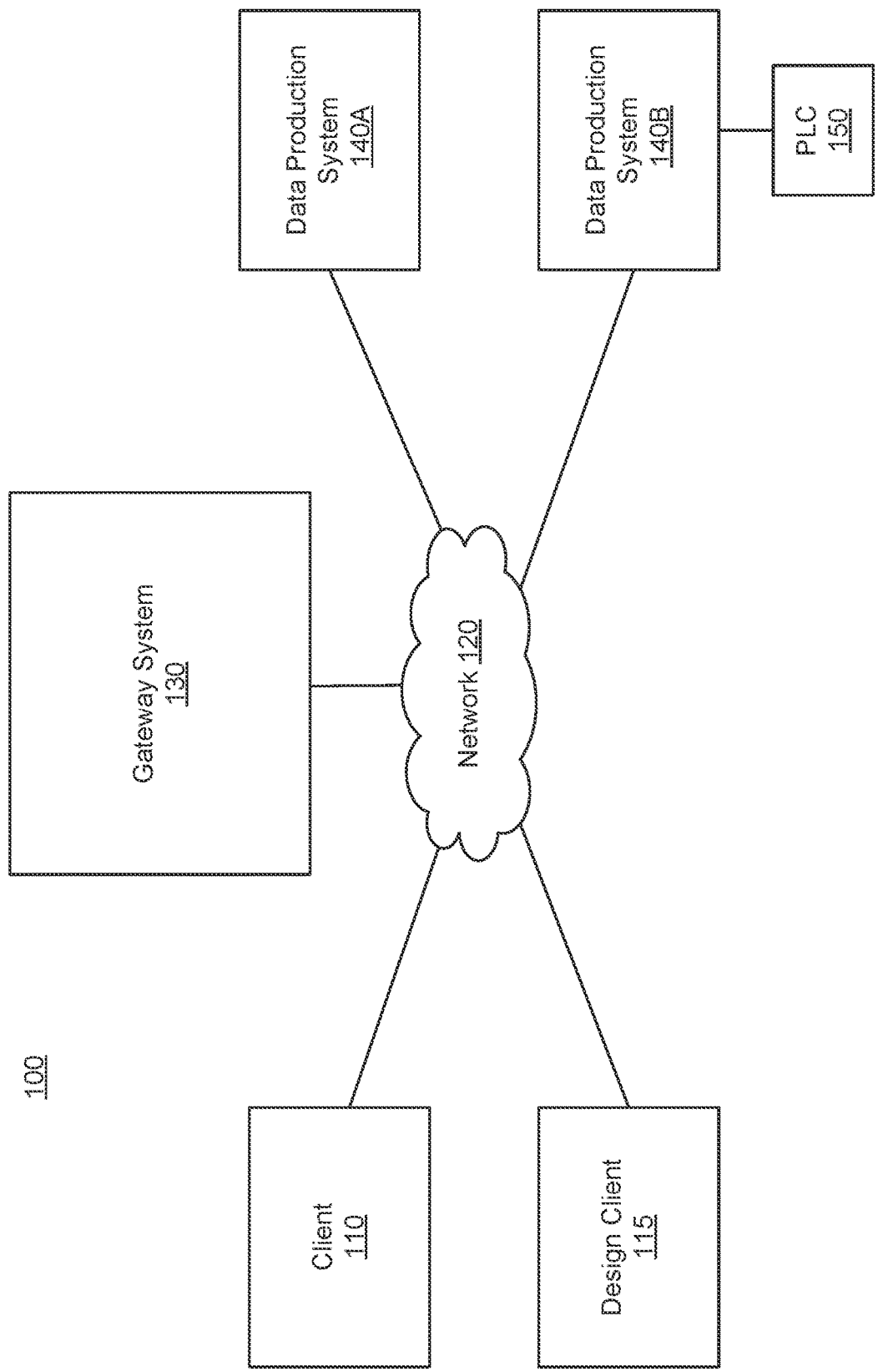
FIG. 1 is a high-level block diagram of a system environment for a gateway system, in accordance with an embodiment.

FIG. 1 is a high-level block diagram of a system environment 100 for a gateway system 130, in accordance with an embodiment. The system environment 100 shown in FIG. 1 includes the gateway system 130, a client 110, a design client 115, a network 120, a data production system 140A, a data production system 140B, and a programmable logic controller (PLC) 150. For clarity, only one client 110, one design client 115, and two data production systems 140 (i.e., 140A and 140B) are shown in FIG. 1. Alternate embodiments of the system environment 100 can have any number of clients 110 and design clients 115, as well as more or fewer data production systems 140. As one example of an alternate embodiment, a client 110, design client 115, and gateway system 130 may all be a part of one machine without interacting over a network 120. The functions performed by the various entities of FIG. 1 may also vary in different embodiments.

The gateway system 130 coordinates the synchronization and display of data on clients 110. That is, the gateway system 130 acts as a backend to support information displayed to users at the client 110 which represents a frontend. The gateway system 130 stores and provides information about user interfaces for applications such as web applications. The web applications may, for example, be web applications for monitoring and interacting with local or remote industrial systems and processes.

User interfaces for the applications may be generated by a designer through a design client 115 and may include views of components. User interfaces may include graphical user interfaces that use one or more graphical elements for interfacing with one or more users. The gateway system 130 stores information about such interfaces for display at clients 110 and manages and routes underlying data that may cause changes to the display of the interface at a client 110. A component is a graphical element in a view and information about the component is stored in the gateway system 130 as a "component data model." Some examples of components include user interaction components, such as sliders, buttons, text fields, and drop down menus; this list is non-exhaustive. Examples of components may further include visual representations of machines or data related to industrial processes such as visual representations of pumps, gauges, dials, levers, motors, conveyor belts, tanks, ovens, graphs, and so forth.

The gateway system 130 acts as an intermediary between the actual industrial processes and information about such processes that is displayed at a client 110. In particular, the gateway system 130 makes it possible to establish uni-directional and bi-directional data bindings such that data coming from a data source, such as a data production system 140 is reflected in information displayed at a client 110. If bi-directional, adjustments made to the industrial process through a component of a GUI at a client 110 also can make changes to the industrial process occurring at the data production system 140.

A user may view and interact with a GUI through a client 110. Clients 110 can be personal or mobile computing devices such as smartphones, tablets, or notebook computers, desktop computers, or other forms of computing devices. In some embodiments, the client 110 accesses GUIs provided by the gateway system 130 via a browser application running on the client 110 that accesses information on the gateway system 130 over the network 120. In some embodiments, the client 110 executes a client application that uses an application programming interface (API) to access GUIs provided by the gateway system 130 through the network 120.

As one example, a user may access a GUI for an industrial process by navigating to the GUI using a browser to interact with the gateway system 130. For example, a manager at an industrial bakery may want to know the temperature of a set of ovens in the bakery. The manager could access a GUI designed to display components representing the ovens and their current temperatures by navigating to the GUI, hosted by the gateway system 130, which is associated with oven temperatures via a browser on the client 110.

The design client 115 is a type of client 110 that is configured to allow a user to design the GUIs that may be accessed via other clients 110. In one embodiment, all clients may also be design clients 115, and design clients 115 may allow a user to do everything a user can do via a client 110, such as viewing and interacting with the GUI. The design client 115 may display a design GUI provided by the gateway system 130 that allows a designer to organize and configure components of a GUI for representing a system, industrial process, or the like. In addition to allowing a designer to define a layout of components for a GUI, the design GUI may include functionality for a designer to establish data bindings between data values originating from various data sources at a data production system 140 and component properties associated with a component in the GUI. For example, a GUI for monitoring oven temperatures in an industrial bakery may include components representing temperature gauges for each oven, configured such that a change in an oven's temperature affects the display of the gauge in the GUI, when viewed at a client. A designer may also use the design GUI to assign values to visual aspects of the components in the GUI, for example, by including labels, designating colors, and the like.

A data production system 140 may be any system that acts as a data source for the gateway system 130. That is, a data production system 140 provides data values to the gateway system 130. Examples of data production systems 140 include open platform communications (OPC) servers, programmable logic controllers (PLCs), web servers supporting representational state transform application programming interfaces (RESTful APIs), databases, or other systems that can provide data values. In some cases, the gateway system 130 may act as a data production system 140 with respect to itself, for example, when a component property is defined in association with properties of another component. In some embodiments, the gateway system 130 may act as a data production system 140 when hosting user-defined data values (sometimes also referred to as "user defined tags"). For example, a designer may store a data value or information for generating a data value (e.g., a script) at the gateway system 130. A GUI displayed at a client 110 may incorporate information received from various combinations of different data production systems 140.

In the example of FIG. 1, data production system 140B may be an example of an OPC server providing an interface between the gateway system 130 and data values produced by a PLC 150. In some embodiments, a PLC 150 stores values referred to as "PLC tags" in a tag database within the memory of the PLC 150. A PLC tag is generally a named variable that can be assigned a type of data and stored in the memory of a PLC 150. Throughout this document, the term "PLC tag" may also be used to refer to the data values output from a PLC 150, which may be received by the gateway system 130 in the form of named variables, or as unnamed data values. In one embodiment, the gateway system 130 represents data values (e.g., including PLC tag values received from PLCs) as data values, as may be stored in a source data store 240 on the gateway system 130.

As an example, the PLC 150 may be coupled to an oven for monitoring and control of oven parameters. The PLC tag values generated by the PLC 150 may be tuples of data values including a scalar value, a quality value, and a timestamp value. For example, a PLC 150 may be coupled to an oven in an industrial bakery, and may be configured to monitor and control the oven temperature and the oven humidity. The PLC 150 may provide data related to the oven temperature and the oven humidity to the gateway system 130 via the data production system 140B. In one example the tuple of data values may include a scalar value for the temperature of the oven, a quality value of the scalar value retrieved from the PLC 150, and a timestamp value corresponding to the determined scalar value. Changes to the oven temperature and humidity may be displayed via the GUI at clients 110 and at the design client 115. In some embodiments, the data production system 140 can also receive data from the gateway system 130 and update associated systems and processes accordingly. For example, a manager at the industrial bakery may adjust target values for the temperature of an oven via components of the GUI at a client 110. The changed value related to oven temperature may be sent by the gateway system 130 to the data production system 140, which can adjust the actual temperature of the oven via the PLC 150.

Clients 110, design clients 115, and data production systems 140 can communicate with the gateway system 130 via the network 120, which may comprise any combination of local area and wide area networks employing wired or wireless communication links. In some embodiments, all or some of the communication on the network 120 may be encrypted.

Figure 2:
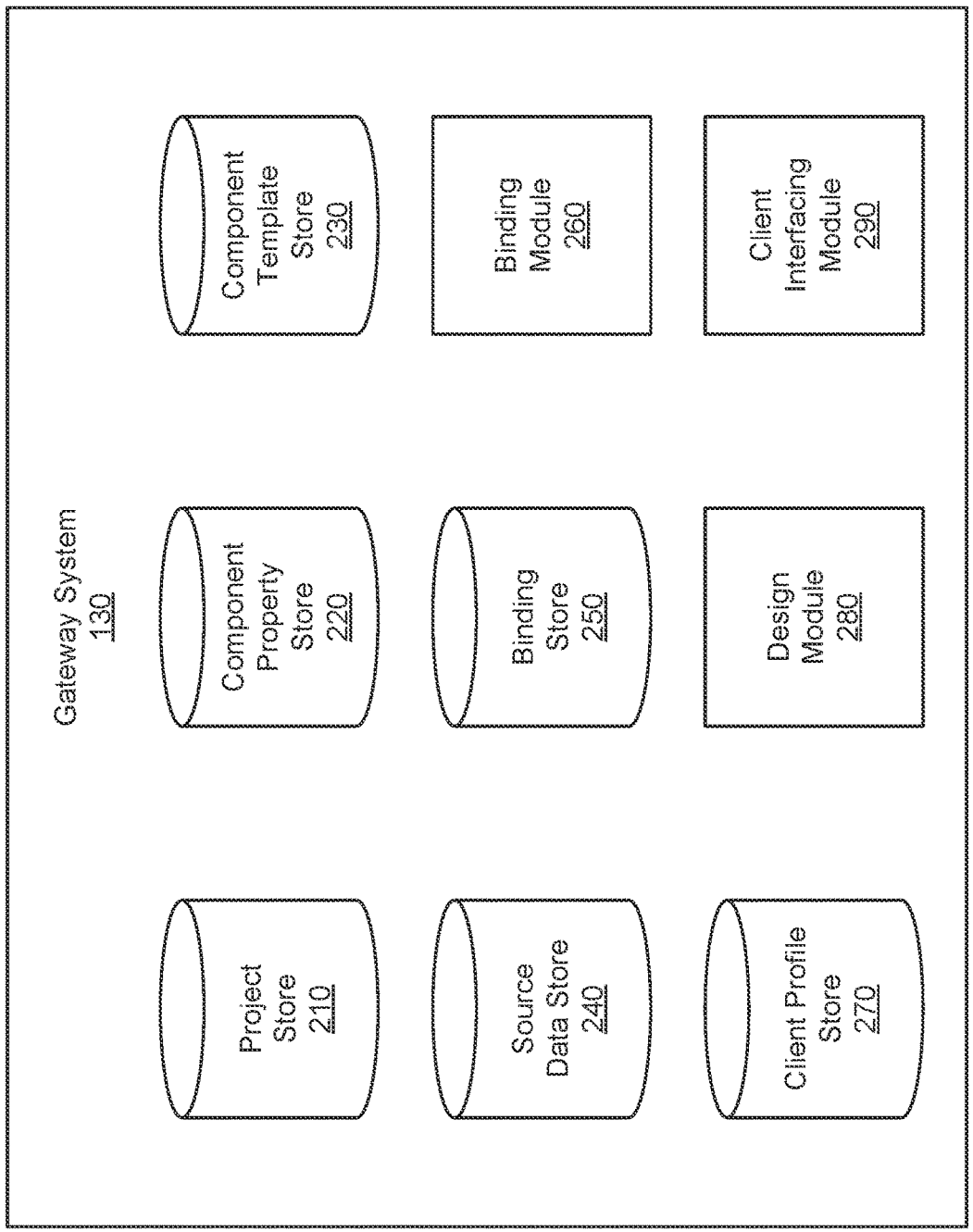
FIG. 2 is a high-level block diagram of a gateway system architecture, in accordance with an embodiment.

FIG. 2 is a high-level block diagram of a gateway system architecture, in accordance with an embodiment. In one embodiment, the gateway system 130 includes a project store 210, a component property store 220, a component template store 230, a source data store 240, a binding store 250, a binding module 260, a client profile store 270, a design module 280, and a client interfacing module 290. In other embodiments, the gateway system 130 may include additional, fewer, and/or different modules from those listed herein. Conventional modules such as web servers, network interfaces, security functions, load balancers, failover servers, management and network operations consoles, and the like are not shown so as to not obscure the details of the system architecture. Additionally, the gateway system 130 may include more, fewer, or different modules and data stores than those shown in FIG. 2, and the functions can be distributed among the modules and data stores in a different manner than is shown in FIG. 2.

The component property store 220 stores information about components (i.e., "component properties") that can be included in a GUI. In particular, the component property store 220 stores property trees that define the properties of the components. A property tree is a data structure comprising a collection of nodes, wherein each node defines some property related to the component. In one embodiment, each node includes a value, a quality, a timestamp value, and a configuration. The multiple values associated with a node are sometimes referred to in this document as a "data value," where a data value is understood to be a tuple of multiple values associated with a node. The quality component is an encoded value that describes the reliability or error state associated with the value. Various quality values may be assigned to various error states defined within the gateway system 130. For example, one quality value corresponds to values that are good, a few quality values correspond to a status of a data source (e.g., PLC 150), and another few quality values correspond to statuses regarding execution of other operations while retrieving the values. The timestamp value records a time and date indicative of when the value was derived. The configuration of a node includes information about data bindings and script handlers that may be associated with the node. The value itself may be a number, a string, a null type, a Boolean, a dataset (i.e., a table-like structure of an ordered collection of rows and columns of information), an array forming an ordered sequence of other nodes in the property tree, or an unordered collection of other nodes.

By virtue of nodes whose values can be an array of other nodes or an unordered sequence of other nodes, a single node is able to encapsulate an arbitrarily structured, deeply nested collection of information, i.e., a tree data structure. These "property trees" are used to define the properties of the components in the GUI.

The component property store 220 stores a component data model for each GUI component. A component data model comprises nodes that represent component properties structured into property trees, the structure of which trees is sometimes referred to herein as a "component hierarchy." Since component properties are represented by nodes in property trees, a component property may be associated with a data value or with a subtree of the component hierarchy comprising additional nodes. In one embodiment, each component property may additionally be assigned a name that identifies the component property.

The project store 210 stores projects that are executable by the gateway system 130. Each project is a human-machine interface (HMI) executed by the gateway system 130 that provides GUIs to one or more clients 110 or 115 for monitoring or controlling systems, such as industrial processes and for interfacing with one or more data production systems 140, such as machines in an industrial system. The project is created and defined by one or more design clients 115 via the design module 280. The one or more design clients 115 communicate with the gateway system 130 to generate and modify the project. Each project presents graphical information via a GUI executed on a client 110. Each project can have project properties that include additional information on that project, e.g., a name of the project, a sub-title, a project description, a date and/or time stamp of project creation or last modification, etc. The project store 210 may store all projects and can provide information about each project to other modules of the gateway system 130.

Each project has one or more views with each view containing information or data presentable to one or more clients 110 via a GUI. Views are graphical portions of the GUI that can display graphical information. Each view contains one or more components. Components are the graphical elements displayed in the view when a project is executed on a client 110, e.g., via a web browser or via an API. Each view has view properties that dictate presentation of the view in the GUI. In some embodiments, each view has view properties that may be categorized into general view properties, parameter view properties, and custom view properties. General view properties may be properties that are present amongst all views and can be toggled to adjust display of the view (e.g., width of the view in the GUI, length of the view, background color of the view, foreground color of the view, name of the view, sub-title of the view, font, etc.). Parameter view properties include parameters that transfer data to and/or from the project to the view. In some embodiments, an input view parameter property receives data external to the page and an output parameter view property transmits data out of the page to the project. In other embodiments, a parameter view property may combine functionality of the input parameter view property and the output parameter view property. Custom view properties may be user-defined and specific to each view.

In some embodiments, pages and containers are used to organize the views within each project. In some embodiments, a page collates one or more views and has associated page properties similar to the view properties defined above for views—such as the general page properties, parameter page properties, and custom page properties. In these embodiments, a page is presented in the GUI such that the one or more views are displayed to be contained within the page. In further embodiments, a container further subdivides a view and may have its own components and its own various container properties similar to the view properties defined above for views.

Components are graphical elements that are placed and configured within a view of a project to be displayed in the GUI when the project is executed by a client 110. As a graphical element, each component has a shape that is defined by one or more features presented in the GUI. The features of components are graphical aspects of the components and are defined by component properties and data values associated with each component property. For example, one feature of a component may be a shape, e.g., sliders, buttons, text fields, and drop down menus. Some components may provide visual representations of machines in industrial processes such as visual representations of pumps, gauges, dials, levers, motors, conveyor belts, tanks, ovens, etc. For example, a component may be a visual representation of a temperature scale. In another example, the component may present a slider that is oriented horizontally. For example, component representing an oven might be a visual representation of an oven and may have component properties such as label, location within the view, color, size, oven temperature, oven humidity, and so forth. In some embodiments, some component properties may store information that does not necessarily influence display of the component in the GUI, but may store additional information about the component or about a data source that may be associated with the component. For example, a designer may choose not to display oven humidity, even though humidity is a component property stored as a data value associated with the oven component.

Component properties may be categorized into general component properties, positional component properties, metadata component properties, and custom component properties. The general component properties may be similar to general view properties described above for the views which are general properties that are present when a component is initially placed into a view—in other words, general component properties are a standard set of component properties that accompany each initial placement of a component in a view. The positional properties describe a relationship of the component to other items (e.g., components, containers, views, and/or pages). The positional component properties may further describe a display position of the component within a displayed view in the GUI. For example, the view may be 300 pixels by 300 pixels and the component may be 50 pixels by 50 pixels centered at the coordinate of [10 pixels, 100 pixels]. The metadata component properties provide additional information about a component. For example, a metadata component property may specify a name of the component, a component description, or a date or time stamp of component creation or last modification. The custom properties may be user-defined and can be specific to each component.

The component template store 230 stores component templates that may be selected and used in projects. The component template store 230 stores a variety of component templates that may be implemented in a view of a project. When a component template is selected and placed in a project, the placed component template generates a component in the project and the component is stored in association with the project in the project store 210. In some embodiments, the component template store 230 is configured to allow for a designer to create new component templates and/or the modification of existing component templates in the component template store 230.

The source data store 240 stores source data in the form of source data models. A source data model comprises data values structured into a source hierarchy where a source hierarchy is a data structure, such as a tree structure. Source data may be received by the gateway system 130 from a data production system 140. As described above, a data values are tuples of one or more values of various types. Value types include a Boolean type, a number type (e.g., INT2 type, INT4 type, INT8 type, FLOAT4 type, FLOAT8 type, etc.), a string type, a date and/or time type, a color type, etc.

PLC tags are one type of data that can be stored as data values in a source hierarchy (e.g., a hierarchical nested structure) within the source data store 240. That is, a hierarchy of data values (e.g., PLC tags) may be used to represent a set of values and how they relate to an entity such as various values associated with a piece of machinery. For example, an oven may be represented by an "oven" data value or PLC tag, which may have child data values associated with PLC tags that report temperature, humidity, pressure, and the like. Data values in the source data store 240 (i.e., in a source data model) can be arranged in inheritance trees, like objects in an object-oriented programming scheme. In some embodiments, this allows data bindings to dynamically reconfigure structural information of user interface components to match the structure of a data value object. For example, a designer may use the system to design a screen set up to show one oven with a dropdown menu that allows the user to select from among 1000 available ovens to view. In this example, the graphical user interface at a client 110 would update in real time to show the user the selected oven, without the designer having to have individually configured each of the different oven views manually when designing the GUI. Instead, the designer would have configured the view to show an oven object and then the gateway system 130 can determine which properties and components to display for each of the individual ovens based on the PLC tags and other data values in the source data model for each of the ovens. This can also be useful in cases of user defined types of source data models, such as when a designer defines an inheritance tree source hierarchy for a new set of sources.

In one embodiment, a data model may correspond to an entity associated with a data source or industrial process. For example, a data model associated with an oven via a data production system 140 may comprise a set of data values corresponding to oven name, oven temperature, oven humidity, and the like (e.g., as obtained from PLC tags). A data model may also comprise subsets including other data models. For example, a data model associated with all of the ovens in an industrial bakery might include a first data value indicating a number of ovens and may further include an array comprising data models for each of the ovens. In this way, data models are structured into a hierarchy.

As another example, a data model could include data received from a data production system 140 comprising a web server that hosts a RESTful API. The data model in such a case may comprise data values from a response to a query of the API, preserving the structure of the query response in the structure of the data model. For example, if the API response is received in JavaScript Object Notation (JSON), the data model store 240 stores the data values in the same hierarchical structure as the JSON response. Notably, a data model does not necessarily include identifications of the individual data values, as is the case of data stored in the component property store 220 in which data values are stored in association with component properties. The client profile store 270 stores client profiles for clients 110 and 115 in communication with the gateway system 130. The client profile store 270 maintains a client profile for each client 110 in communication with the gateway system 130. Client profiles may include various information including identifiers (e.g., IP address, MAC address, Bluetooth address, etc.), historical logs, accessibility settings, generated reports, current or historical geolocation(s) according to established gateway sessions, etc. In some embodiments, projects are only designated for access by permitted client profiles. Only clients 110 with client profiles that have been granted access can access projects by the gateway system 130. In other embodiments, the client profile store 270 may classify certain client profiles associated with design clients 115 with the permission to access the design module 280 to provide one or more modifications to one or more projects in the project store 210.

The design module 280 generates and modifies projects in the project store 210. The design module 280 may generate new projects that may be stored in the project store 210. When generating a new project, the design module 280 may also define a structure of the project in a project navigation hierarchy a tree structure of including number of pages, number of views per page, number of containers or components per view, number of components per container, etc. In some embodiments, a page may contain any combination of pages, views, containers, and components. In some embodiments, a view may contain any combination of views, containers, and components but not pages. In some embodiments, a container may contain any combination of containers and components but neither pages nor views. Once a structure of the project is defined, the design module 280 may set one or more properties of items in the project. For example, the design module 280 may set one or more properties such as the name of each of the pages, sizes of each view within a page, a color background of views within a page, etc. To place components in the project, the design module 280 retrieves a component template from the component template store 230. Once a component template is retrieved, the design module 280 places a component in the project based on the retrieved component template. The design module 280 may further set properties of the added component. In some embodiments, the design module 280 receives a request to establish a data binding between a component property and a source data model. In these embodiments, the design module 280 provides the request including the component property and the source data model to be bound together with the data binding to the binding module 260. Once a project is created, the design module 280 may modify projects in the project store 210.

In some embodiments, the design module 280 may set accessibility settings for each project. For example, the design module 280 assigns one or more design clients and their corresponding client profiles with access to certain projects. When a design client 115 attempts to communicate with the design module 280 to edit a project, the design module 280 may verify that the design client 115 is associated with a client profile that has designated with access to editing the project. Once verified, the design client 115 provides input corresponding to edits of the project to the design module 280 through a design GUI which then causes the design module 280 to edit the project in the project store 210. In other embodiments, the design module 280 may set tiers of accessibility settings for clients. For example, a first tier allows editing of certain items in the project (e.g., views and components), a second tier allows editing for all components in the project, a third tier allows editing of one or more designated components in the project, and a fourth tier allows viewing of the project, etc.

The client interfacing module 290 moderates communication between the gateway system 130 and one or more clients 110 or 115. The client interfacing module 290 receives a request from one or more clients 110 or 115 to communicate with the gateway system 130 for accessing a project in the project store 210. Each request by a client 110 or 115 may include a client profile identifier that specifies a client profile associated with the client 110 or 115 and may further include a project identifier that specifies a project in the project store 210. In further embodiments, a request includes a type of client (e.g., application on an external device communicating with the gateway system 130, a web browser on a mobile device, etc.). In other embodiments, a request also includes one or more inputs that may affect display of the project. For example, the request may be a URL web address that also provides an input to a component property in the project. The client interfacing module 290 may access a client profile store 270 to identify a client profile for each client based on the client profile identifier. The client interfacing module 290 then accesses the project store 210 for the project that is requested to be accessed by the client. The client interfacing module 290 may further verify accessibility settings for the project against the client profile to determine what access to provide the client. In embodiments described above with tiers of accessibility, the client interfacing module 290 determines a set of operations that the client is permitted. If the client is a design client 115 as determined by the client profile of the design client 115, the client interfacing module 290 may provide the design client 115 with complete access to modify the project. Once a client profile is verified to have access to the project, the client interfacing module 290 generates a gateway session for the client 110 or 115 through which the client interfacing module 290 may provide a GUI or a design GUI.

The client interfacing module 290 provides a graphical user interface (GUI) to a client 110 for accessing a project. In one instance, the client 110 is permitted to view the project in the project store 210 based on accessibility settings. The client interfacing module 290 accesses the project store 210 to retrieve the requested project. The client interfacing module 290 renders a GUI that presents the project to the client 110 based on properties stored for the project. In embodiments where the project includes one or more components, the client interfacing module 290 accesses the component property store 220 to retrieve data values corresponding to component properties. Based on the retrieved data values for the component properties, the client interfacing module 290 may render the components of the project in the GUI.

In some embodiments, the client 110 may have permission to provide one or more inputs to component properties in a project. The client interfacing module 290 may receive the one or more inputs to the component properties and may provide the inputs to the component property store 220. In some embodiments, the client 110 provides data values assigned to one or more of the component properties which are then populated in the component property store 220 by the client interfacing module 290. The client interfacing module 290 may update the GUI in response to the provided inputs to component properties.

The client interfacing module 290 provides a design GUI to a design client 115 for modifying a project. In one instance, the design client 115 is permitted to modify the project based on accessibility settings. The client interfacing module 290 accesses the project store 210 to retrieve the requested project. The client interfacing module 290 renders a design GUI that presents the project to the client 110 based on properties stored for the project. In embodiments where the project includes one or more components, the client interfacing module 290 accesses the component property store 220 to retrieve data values corresponding to component properties. Based on the retrieved data values for the component properties, the client interfacing module 290 may render the components of the project in the design GUI. The client interfacing module 290 also renders one or more additional design elements for aiding in modification of the project. The design client 115 provides inputs through the design GUI which is then received by the client interfacing module 290. The client interfacing module 290 may relay the inputs to the design module 280 for modification of the project.

In some embodiments, a client 110 or 115 requests a specific item in the project for display in a GUI to the client 110 or 115. For example, a client 110 is attempting to view a page from a project and may then provide a request with a URL web address that may be used to retrieve the page by the client interfacing module 290. The client interfacing module 290 retrieves the project and identifies the specified item in the project. The specified item may be a specified page, a specified view, a specified container, or a specified component. The client interfacing module 290 determines what other items are contained with the specified item. The client interfacing module 290 then retrieves properties from the project store 210 and/or component properties for components within the specified item. The client interfacing module 290 then generates a GUI with the retrieved properties and component properties and presents the GUI to the client 110 or 115. In further embodiments, the client 110 or 115 may provide navigational inputs to display another item in the project. For example, the client 110 or 115 provides a navigation input to change from one page to another; in response, the client interfacing module 290 identifies the subsequent page to be displayed and updates the GUI to display the subsequent page.

Binding System

The binding store 250 stores information about data bindings. A data binding is an association between one or more data values from a data source such as a data production system 140 and one or more component properties (stored as information at nodes) in the component property store 220. A data binding may establish a relationship between a single component property and a single data value from a data production system 140, or a data binding may establish a relationship between a subtree of a component model and a subtree of a source data model (i.e., establishing a binding between multiple data values and multiple component properties at once). As an example of a binding between a single component property and a single data value from a production system 140, a designer may specify a data binding between an oven component's component property for "color" and a data value representative of the actual oven temperature, and may configure the GUI such that the oven component's color will change from green to red when a data value received from the data production system 140 indicates that the oven temperature is over 500 degrees Fahrenheit. As an example of binding a subtree of a component data model to a subtree of a source data model, a designer may specify a binding that associates a component data model that represents an oven to source data model that includes the data values associated with the oven. That is, when any of the data values associated with the oven change (e.g., temperature, humidity, etc.) those data values with corresponding component properties in the bound oven component in the component property store 220 will update accordingly.

In one embodiment, the binding store 250 records data bindings in the form of data paths that are associated with source data models. That is a data path from a root directory of a project may lead to a particular component data model and may be stored in association with a source data model to indicate that the data values in each should update to match each other. In one embodiments, the binding store 250 may further include metadata about a data binding, such as information about how often to update the data binding or information about actions to perform in response to a change in a data value from either the source data model or the component data model. In an alternate embodiment, metadata about the binding associations and actions may be stored in the component property store 220 in association with the relevant component data rather than in a binding store 250.

In one embodiment, a binding may also be configured using a "transform" wherein a data value at a node of the component data model and a data value from the source data model are related, but may not be equivalent values or matching types. For example, a binding stored in the binding store 250 may include a configuration indicating that a color property of a component is bound to a numeric value in the source data model. The configuration includes a transform indicating a rule or function that dictates how a component property value should change when a source data value it is bound to changes (and a rule or function describing the transformation in the other direction). In the number to color example, the color property might be set to turn the component red when the associated number is greater than 100 and green when the associated number is 100 or less. Other examples of transforms that may be included in a binding configuration include functions, scripts, set of rules, formatting changes, and the like.

In one embodiment, the gateway system 130 may support a variety of binding types for associating data from various sources with components. Some examples of binding types may include: a property binding, an expression binding, a tag binding, an expression structure binding, a query binding, a tag history binding, and an HTTP binding.

The following are several examples of different binding types including example property tree layouts for configuration property trees that may be used to define configuration information for components with such bindings. The examples below are examples in which the binding configuration information is stored in the component property store 220 as paths included inside a configuration property tree, rather than in a binding store 250.

A property binding is used to bind a component property to another component property in the same view. Bi-directional read and write is supported with property bindings. An example component hierarchy for a property tree associated with the configuration of a component that has a property binding is:

type: property
Config schema:
{
  "type": "object",
  "properties": {
    "path": {
      "type": "string",
      "description": "Path to the property that drives this binding."
    },
    "bidirectional": {
      "type": "boolean",
      "default": false
    }
  },
  "required": ["path"],
  "additionalProperties": false
}

An Expression Binding is used to bind a property to the value of an expression. The expression may reference other properties within the same view. An example component hierarchy for a property tree associated with the configuration of a component that has an expression binding is:

type: expr
Config Schema:
{
  "type": "object",
  "properties": {
    "expression": {
      "type": "string",
      "description": "The expression source code."
    }
  },
  "required": ["expression"],
  "additionalProperties": false
}

A tag binding is used to bind a property to a tag, such as a data value from a data source like a PLC. Tag binding may be direct, if the path to the value is static, or indirect if the path to the value is dynamic and calculated with an expression form. Bidirectional read and write is supported for tag bindings.

type: tag
Config Schema:
{
  "type": "object",
  "properties": {
    "tagPath": {
      "type": "string",
      "description": "The path to the tag to bind to"
    },
    "bidirectional": {
      "type": "boolean",
      "default": false
    }
  },
  "required": ["tagPath"],
  "additionalProperties": false
}

Figure 3:
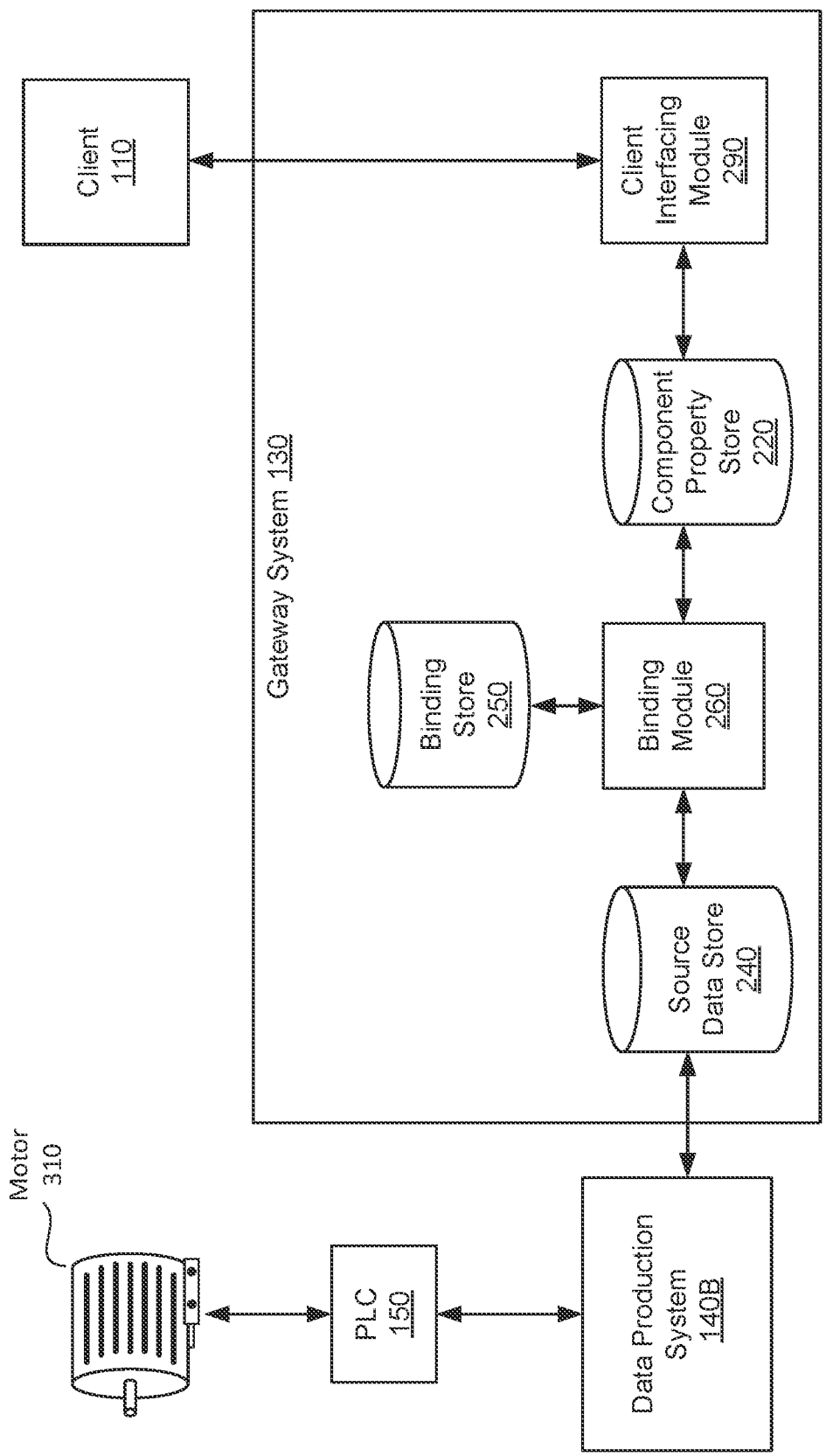
FIG. 3 is a high-level data flow diagram illustrating interactions between components of a data production system, a gateway system, and a client.

FIG. 3 is a high-level data flow diagram illustrating interactions between components of a data production system 140, a gateway system 130, and a client 110. In particular, FIG. 3 shows one example configuration by which information may transfer between a motor 310 (e.g., as involved in an industrial process) and a client 110.

The motor 310 is coupled to a PLC 150 which monitors and controls the motor 310. For example, the PLC may monitor whether or not the motor 310 is running and the current speed of the motor 310. In some cases, the PLC can also control the state of the motor 310 such as by turning the motor 310 on or off, or by adjusting the speed of the motor 310. The PLC 150 may send data about the motor 310 to a data production system 140, such as an OPC server which provides a bridge for software systems such as a gateway system 130 to communicate with process control hardware such as a PLC 150. In some embodiments, the PLC 150 provides PLC tags that may be tuples of data values. The tuples include three data values that can be a scalar value, a quality value, and a timestamp value.

In one embodiment, when the data production system 140 provides data about the motor to the gateway system 130, the data values are stored in the source data store 240. The data values in the source data store 240 may be stored in a source hierarchy structure. The gateway system 130 may notify the binding module 260 that new data has been received from the data production system 140. In some embodiments, the binding module 260 may periodically check the source data store 240 to determine if any data has been changed.

The binding module 260 monitors and manages data bindings stored in the binding store 250. The binding module 260 may also determine whether the updated data in the source data store 240 is associated with any bindings, configurations of which may be stored in the binding store 250. In one embodiment, the binding module 260 may analyze a graph for dependencies and may generate a startup order for bindings based on the dependencies, while accounting for startup lag. The binding module 260 is discussed in further detail in accordance with FIG. 4.

Figure 4:
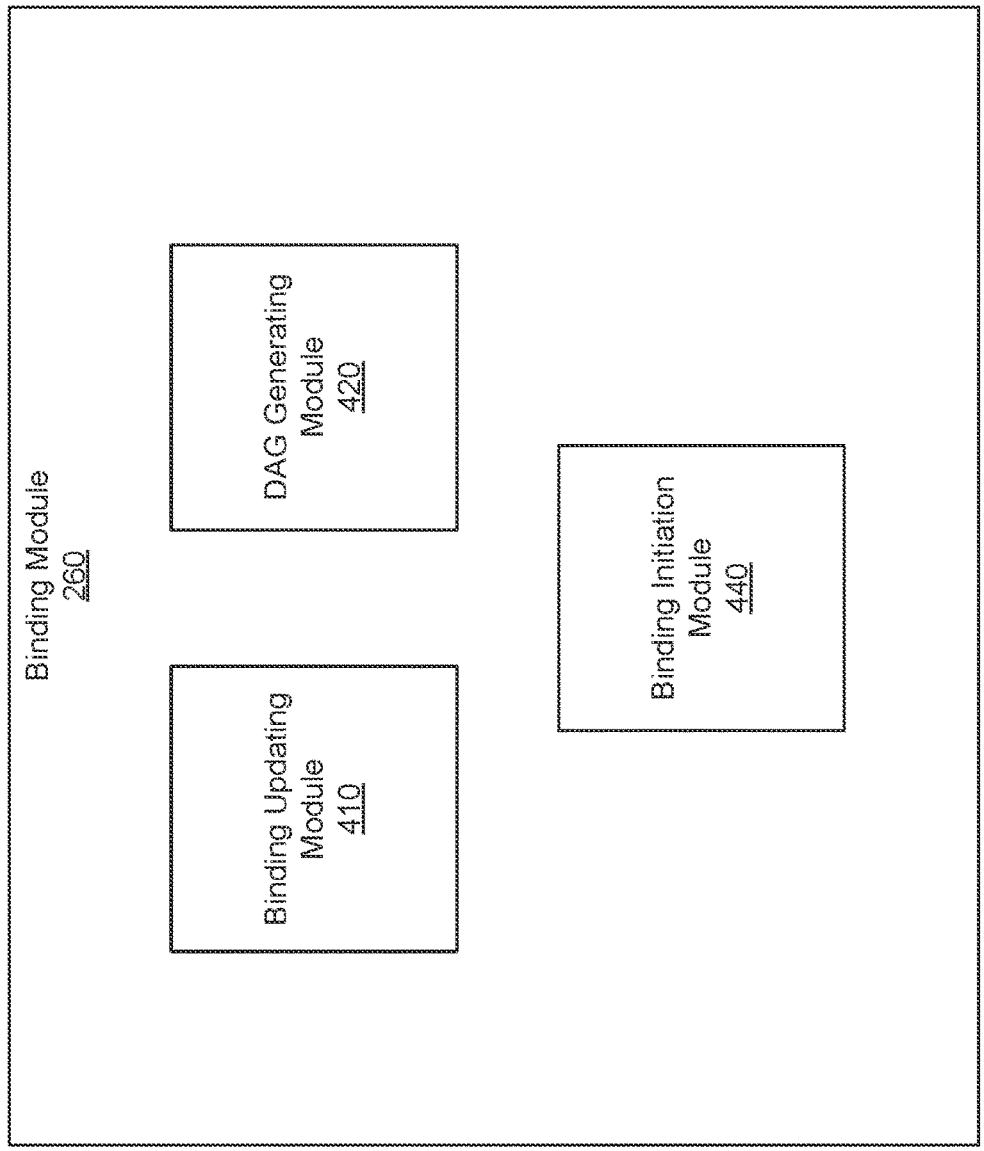
FIG. 4 is a block diagram illustrating a binding module, in accordance with one embodiment.

FIG. 4 illustrates one exemplary embodiment for a binding module 260. In FIG. 4 the binding module 260 may include a binding updating module 410 that processes updated values for bindings, a DAG (directed acyclic graph) generating module 420 that generates a graph for dependencies for updating bindings, and a binding initiation module 440 that initiates a binding based on the dependency graph.

The binding updating module 410 may receive a request to update a data value for a component property. When the binding updating module 410 receives a notification that a data value or source data model stored in the source data store 240 has changed, the binding updating module 410 identifies whether that data value is included in a data binding by referencing the binding store 250 and updates the data value for the associated component property or component data model. Similarly, when the binding updating module 410 receives a notification that a data value for a component property or a component data model stored in the component property store 220 has changed, the binding updating module 410 determines whether that component property or component data model is included in a data binding by referencing the binding store 250 (or by referencing configuration data about the node stored in the property tree) and updates the data value in the associated source data model accordingly. For example, if one data value associated with a node in a subtree of a component hierarchy of a component data model is changed, the binding updating module 410 updates the associated component data value within a subtree of the bound source data model at the corresponding position in the source hierarchy.

In addition to updating data values to reconcile component data models and source data models that are bound together, the binding updating module 410 may also update the structures of the bound component data models and source data models to match. That is, the binding updating module 410 updates the structure of a subtree of a property tree for a component data model in response to a structural change in the subtree of the source hierarchy for the source data model to which the component data model is bound. For example, a subtree of a component data model may include nodes that represent a set of four oven components, and the subtree of the component data model may be bound to a subtree of a source data model for data coming from a data production system 140 at an industrial bakery. The industrial bakery may add an additional oven to the bakery system and update the data production system 140 such that the data values in the source data model, as received from the data production system 140 include an additional set of data values related to the new oven. This would have the effect of updating the structure of the source hierarchy such that the subtree that includes the information about the individual ovens includes an additional set of data values for the new oven. When the gateway system 130 receives and stores the updated source data model in the source data store 240, the binding updating module 410 accordingly identifies the subtree of the property tree that is bound to the subtree of the source data model. The binding updating module 410 updates the component hierarchy of the component data model such that the subtree of the component data model includes a set of component properties for the new oven. In one design configuration, this change may further affect the display of the GUI, such that a component representing the new oven may be displayed.

In one embodiment, the binding updating module 410 may determine that a binding to be updated depends on other bindings or components, who may further depend on additional bindings. In such case, the binding updating module 410 may simply initiate a binding to be updated in the chain of dependent bindings in a random order. That is, the binding updating module 410 may initiate a binding in a chain of dependent bindings randomly, where each binding may be configured in dependently and is not aware of each other. However, if a binding is not configured, a binding that is dependent on the binding might produce a null state (or an empty string, or a zero value), which may further cause inefficiency. In one embodiment, the binding updating module 410 may configure bindings in an order based on a graph for dependencies generated by the DAG generating module 420, which is discussed in further detail below.

The DAG generating module 420 may generate a DAG (directed acyclic graph) based on dependencies of bindings. In one embodiment, the DAG generating module 420 may generate a DAG (or may be referred to as a dependency graph) in real-time when the binding updating module 410 receives a request to update a data value and determines that the binding has dependencies. In some embodiments, the DAG generating module 420 may generate dependency graphs in advance for each binding and store the dependency graph in the binding store 250. If the binding updating module 410 receives a request to update a value associated with a binding, the DAG generating module 420 may retrieve the dependency graph from the binding store 250 and use the dependency graph as a reference for configuring the update.

The DAG generating module 420 may generate a graph for dependencies, with each node representing a binding, and each edge connecting the nodes representing references to properties associated with the bindings in the attached nodes. The DAG generating module 420 may generate a node for each binding in a chain of dependent bindings and generate an edge for each binding with a property referenced by another binding. That is, a binding may be connected (or associated) with another binding because a property referenced in a binding is also referenced in another binding. The connection between the bindings may be represented by an edge in a dependency graph generated by the DAG generating module 420. In one embodiment, each edge in the dependency graph is directional. That is, a property in a binding may depend on a value in another binding, and the DAG generating module 420 may generate an edge from the dependent to the dependee (or vice versa).

The DAG generating module 420 may generate the graph for dependencies hierarchically. The DAG generating module 420 may generate a graph for dependencies by first identifying a first set of nodes without any outgoing edges and first initialize the first set of nodes. Then, the DAG generating module 420 may identify a second set of nodes that are directly connected to the first set of nodes. That is, the DAG generating module 420 may then identify the second set of nodes as the nodes that are one edge away from the set of nodes without any outgoing edges. The DAG generating module 420 may then identifying a third set of nodes that are directly connected to the second set of nodes, that is, the set of nodes that are two edges away from the first set of nodes. The DAG generating module 420 may repeat such a process until all the nodes that the target binding replies upon are identified in the dependency graph. The DAG generating module 420 may stop identifying bindings until the target binding and all the bindings that the target binding depends on are included in the dependency graph. The DAG generating module 420 may then remove any loops or cycles in the dependency graph by identifying any binding that does not have an originating point. In one embodiment, if the DAG generating module 420 discovers a loop in the dependency graph, the system may deploy a rand om-order startup within the view.

Figure 5:
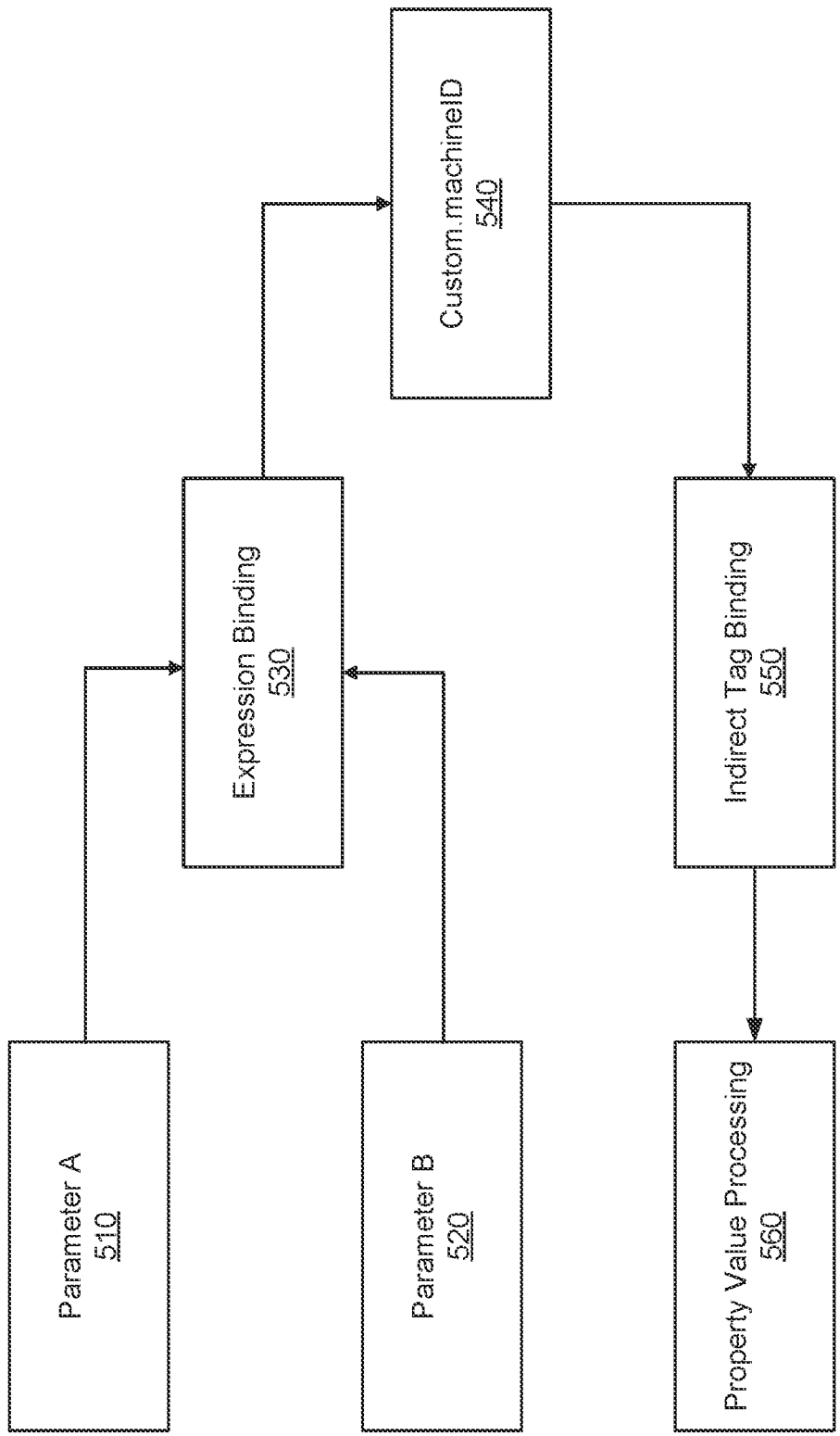
FIG. 5 is a high-level flow chart that describes a process for updating a component hierarchy structure that is bound to a source hierarchy structure in response to changes to the source hierarchy structure, in accordance with an embodiment.

The binding initiation module 440 may initiate bindings based on the dependency graph. The binding initiation module 440 may first identify, based on the dependency graph, a first set of bindings that do not depend on any other bindings, and figure the first set of bindings first. The binding initiation module 440 may then monitor and keep track of configuration results of the first set of bindings. If a binding successfully returns an output, the binding initiation module 440 may initiate any bindings that depend on the binding that has an output available. In one embodiment, the execution of the configuration bindings is event driven. That is, if a target binding is dependent on receiving results from a group of other bindings, the target binding may not be initiated until all the required inputs are received from other bindings on which the target binding depends. FIG. 5 illustrates a dependent configuration process performed by the binding module 260 with a specific example.

FIG. 5 illustrates an exemplary process for initiating a binding with dependencies. In FIG. 5, the expression binding 530 may depend on parameter A and parameter B as inputs. For example, the expression binding 530 may be instructed to concatenate the inputs from parameter A 510 and parameter B 520. As an example, parameter A 510 may be the term "Oven" and parameter B 520 may be a number such as "99". The concatenated result may be inputted as a parameter such as a machine ID for Custom.machineID 540. For example, Custom.machineID may take "Oven 99" as a parameter which is used in the indirect tag binding 550. The indirect tag binding 550 may take "Oven 99" as an input for machine ID and further passes the tag "Oven 99" to property value processing 560 for updating data values for Oven 99. In the embodiment illustrated in FIG. 5, the indirect tag binding 550 depends on the results generated by the expression binding 530. The indirect tag binding 550 may wait for the expression binding 530 to generate the expression "Oven 99" which further gives value to Custom.machineID 540, which is an input for the indirect tag binding 550.

In one embodiment the binding module 260 may start either expression binding 530 or indirect tag binding 550 in a random order. In another embodiment, the binding updating module 410 may receive input parameter A 510 and parameter B 520. The DAG generating module 420 may generate a dependency graph based on dependencies, which, in the example illustrated in FIG. 5, is that the indirect tag binding 550 depends on the expression binding 530. FIG. 5 only illustrates a dependency graph with two bindings, but in reality, many bindings may be involved in a dependency graph. The binding initiation module 440 may initiate bindings based on the dependency graph, starting from the bindings that do not depend on any other bindings. In one embodiment, the binding initiation module 440 may wait until the expression binding 530 outputs a result to Custom.machineID 540 before initiating the indirect tag binding 550. The binding initiation module 440 may not initiate a binding until the inputs required for the binding are received and ready to be used as inputs.

Exemplary Graphical User Interface for Dependent Bindings

Figure 6:
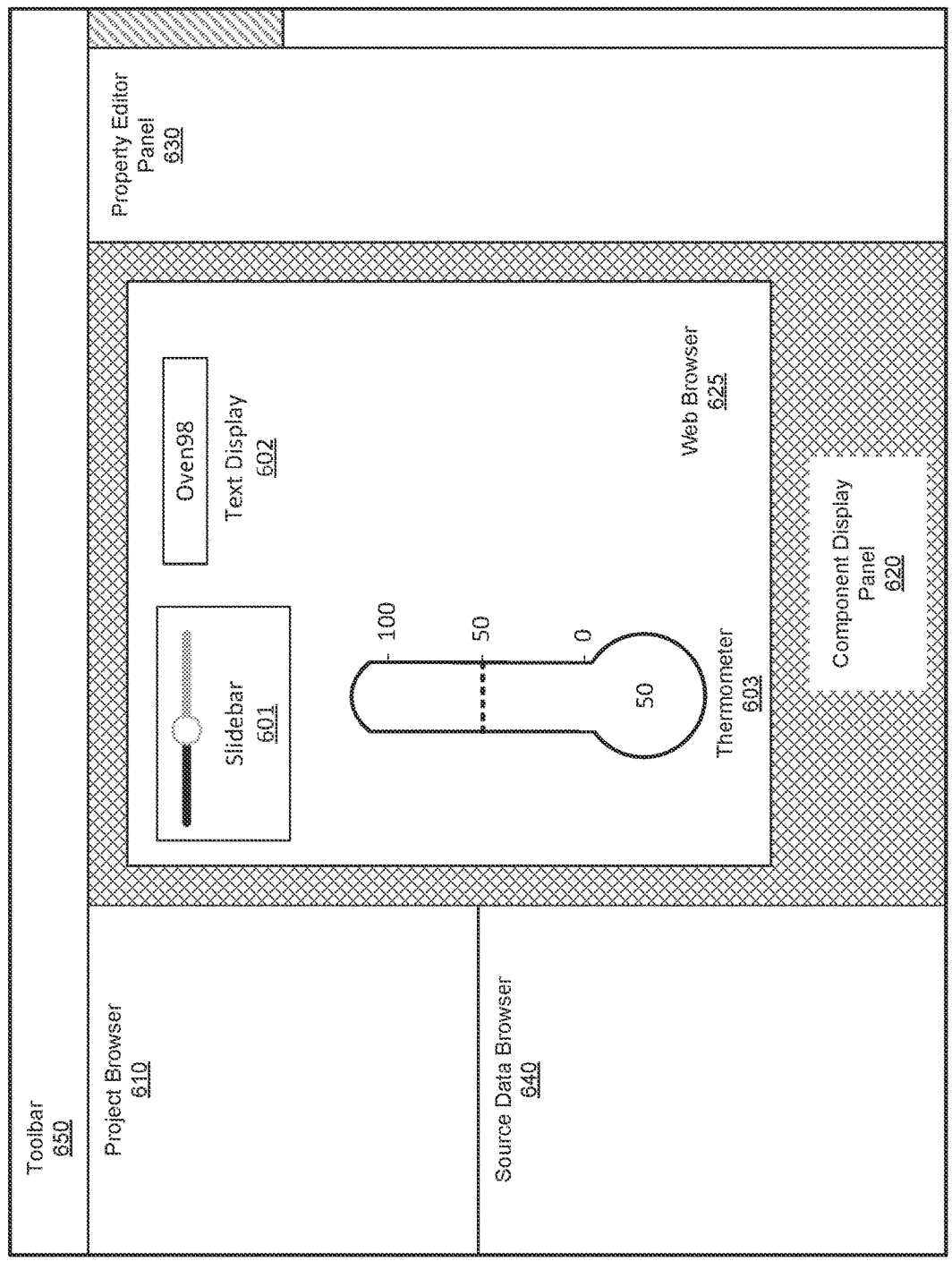
FIG. 6 is an illustration of a graphical user interface (GUI) for a client, in accordance with one or more embodiments.
Figure 7:
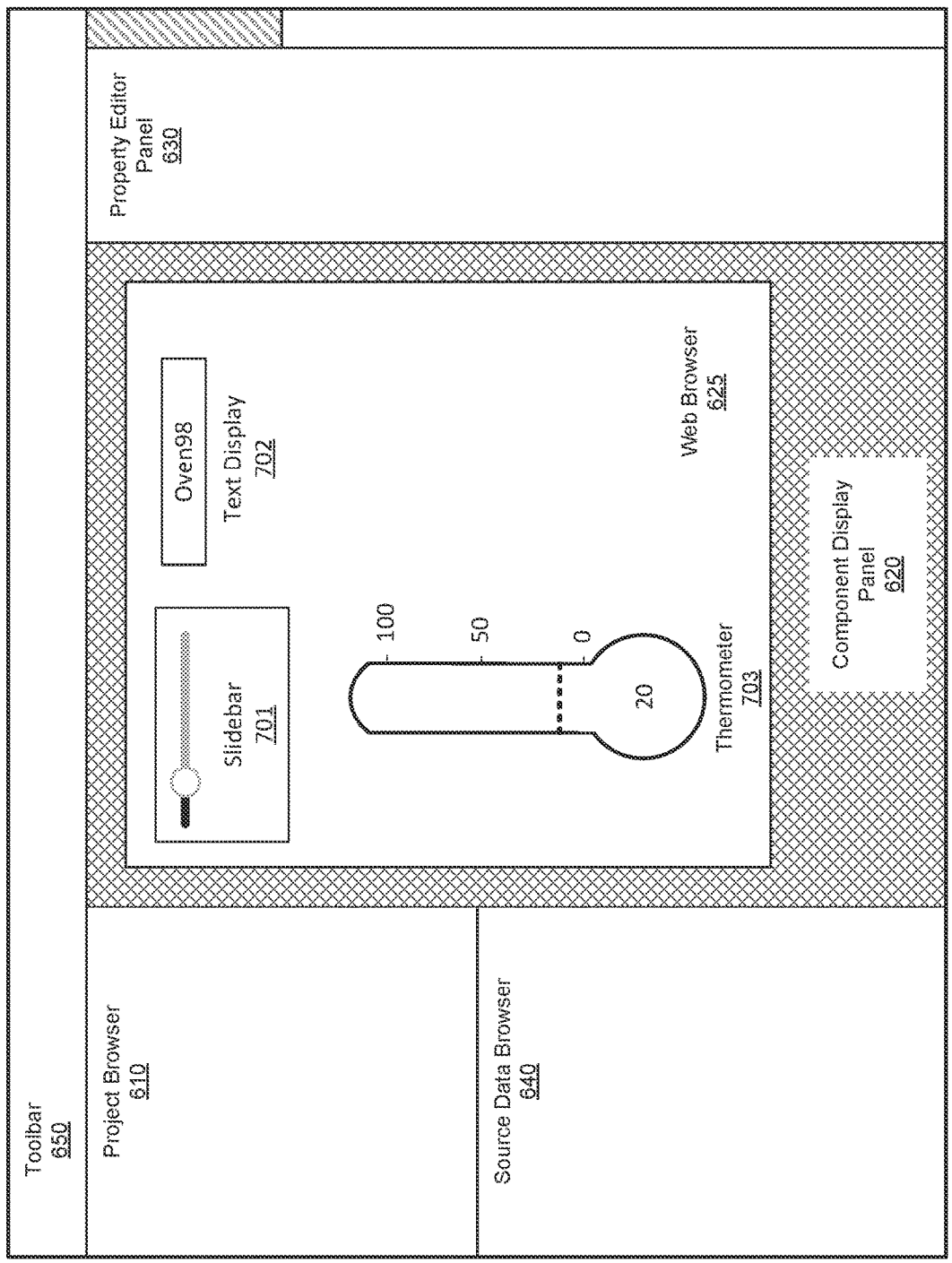
FIG. 7 is an illustration of a process of editing data on a graphical user interface (GUI) for a client, in accordance with one or more embodiments.

FIGS. 6-7 illustrate examples for a set of dependent bindings and references to properties of bindings.

FIG. 6 is an illustration of a design graphical user interface (GUI) 600, in accordance with one or more embodiments. The design GUI 600 includes a project browser 610, a component display panel 620, a web browser 625, a property editor panel 630, a source data browser 640, and a toolbar 650 which are graphical elements in various portions of the design GUI 600. In addition, the design GUI 600 may have one or more options that are graphical elements, such as slide bar 601, text display 602, and thermometer 603. The one or more graphical elements may be displayed and configured to receive one or more inputs. In other embodiments, the design GUI 600 may have additional or fewer graphical elements than those listed herein. Additionally, the functions described for the listed graphical elements may be variably distributed amongst the other graphical elements. In other embodiments, the placement of the graphical elements relative to one another in the design GUI 600 may be different.

The project browser 610 displays a project navigation hierarchy. In some embodiments, the project browser 610 is configured to receive a navigation input of navigating to a page, a view, a container, or a component in the project navigation hierarchy. For example, the designer using the design GUI 600 may provide, via a design client 115, a selection input of a view in the project. In response to selection of the view in the project browser 610, the project browser 610 visually distinguishes the selected view in the project browser 610. Moreover, the client interface module 290 may update other graphical elements in response to the selection input of the view.

The property editor panel 630 is configured to receive edit inputs corresponding to editing the component data model. In the displayed set of component properties, a designer may provide an edit input, via the property editor panel 630 for editing the component data model. When the edit input is provided, the property editor panel 630 may relay the edit input to the design module 280 for updating the component properties in the component property store 220.

The source data browser 640 displays one or more source data models. The source data browser 640 displays a source data model with the data values structured in the source hierarchy. In some embodiments, the source data browser 640 may receive an input specifying a source data model to be displayed. In embodiments where the data values are tuples of one or more data values of various types, the source data browser 640 may present one or more of the data values in the tuples. In one example of a source data as PLC tags provided by an OPC server, the source data may be provided in tuples including a scalar value, a quality value, and a timestamp value. The source data browser 640 may have additional functions for navigating around source data models or for editing source data models.

The toolbar 650 displays one or more options configured to receive inputs. When a designer, via a design client 115, clicks on one of the options, the toolbar 650 receives the input corresponding to that option. The various options may include but are not limited to creating a new project, adding a page to an existing project, adding a view to an existing project, adding a container to an existing project, opening an existing project, saving a project currently being edited, undoing an input, redoing an input, cutting of an item in the project, pasting of an item into the project, deploying a project, refreshing the design GUI 600, etc.

The component display panel 620 displays a view of a project. The component display panel 620 contains a web browser 625 that is another graphical element. The web browser 625 is a graphical element in the GUI 600 that presents visual information in a web page format. The component display panel 620 displays, in the web browser 625, one or more components in a selected view. The component display panel 620 displays each component according to a set of component properties that define an appearance of the component in the web browser 625. In additional embodiments, each component has one or more features that are graphical aspects to the component.

For example, as illustrated in FIG. 6, an oven component may have features that include a graphical thermometer scale 603, a slide bar 601 for controlling temperatures, a visual representation of an oven, a text display 602 for inputting a tag associated with an oven, a graphical pressure scale, an oven volume capacity percentage, etc. The component display panel 620 is configured to receive a selection input of a component that is displayed in the web browser 625. A designer may click on the component in the web browser 625. In response, the component display panel 620 may visually distinguish the selected component in the web browser 625. Additionally, the selection input may prompt other graphical elements to update.

The component display panel 620 is configured to also receive a movement input corresponding to moving a component within the web browser 625. In one example, the designer may click and hold the slide bar 601 in the web browser 625. The component display panel 620 may update the display of the slide bar 601 to match movement of the designer's mouse or pointer used to click and hold the component. When the designer releases the slide bar 601 in the web browser 625, the component display panel 620 may update display to place the slide bar 601 at a position in the web browser 625 where the mouse or pointer was released.

FIG. 6 illustrates several bindings that may depend on each other. For example, the slide bar 601 may take input from a designer, who may indicate a temperature for an oven specified by the text display 602. Text display 602 may take two parameters as input, one being the name of the component (e.g., "oven"), the other being an identity number (ID number) (e.g., "98".) The thermometer 603 may take temperature from the slide bar 601 as input, and also the ID number from the text display 602 as another input and generates a display corresponding to the property of the component, which in the specific example is the temperature of oven 98. As illustrated in FIG. 7, if the designer adjusts the numerical value input from the slide bar 601 to 20 degrees, the binding updating module 410 may receive the request for updating the value. The DAG generating module 420 may generate a dependency graph responsive to receiving the request, where the dependency graph may include information that the thermometer 703 depends on slide bar 701 and the text display 702, and that the slide bar 701 and the text display 702 do not depend on any other bindings. The binding updating module 440 may determine to not initiate the thermometer 703 until the slide bar 701 and the text display 702 have results ready to use. The binding updating module 440 may finally update the display of thermometer 703 after the slide bar 701 and the text display 702 finish configuration.

FIG. 8 illustrates an exemplary configuration process 800 based on dependency graph. The process 800 may start with the binding initiating module 440 accessing 810 a graph comprising a set of nodes. The graph may be generated by the DAG generating module 420. Each node may represent a binding and is associated with a component property of a component hierarchy corresponding to a hierarchical structure of a data model. Each node of the graph may be connected to at least another node with an edge representing a dependency in the hierarchical structure of the data model. The binding updating module 410 may receive 820 a request to generate a view associated with the set of bindings. The binding initiation module 440 may determine 830 an order to load the set of bindings based on the graph, and may load 840 the set of bindings based on the determined order.

CONCLUSION

Figure 9:
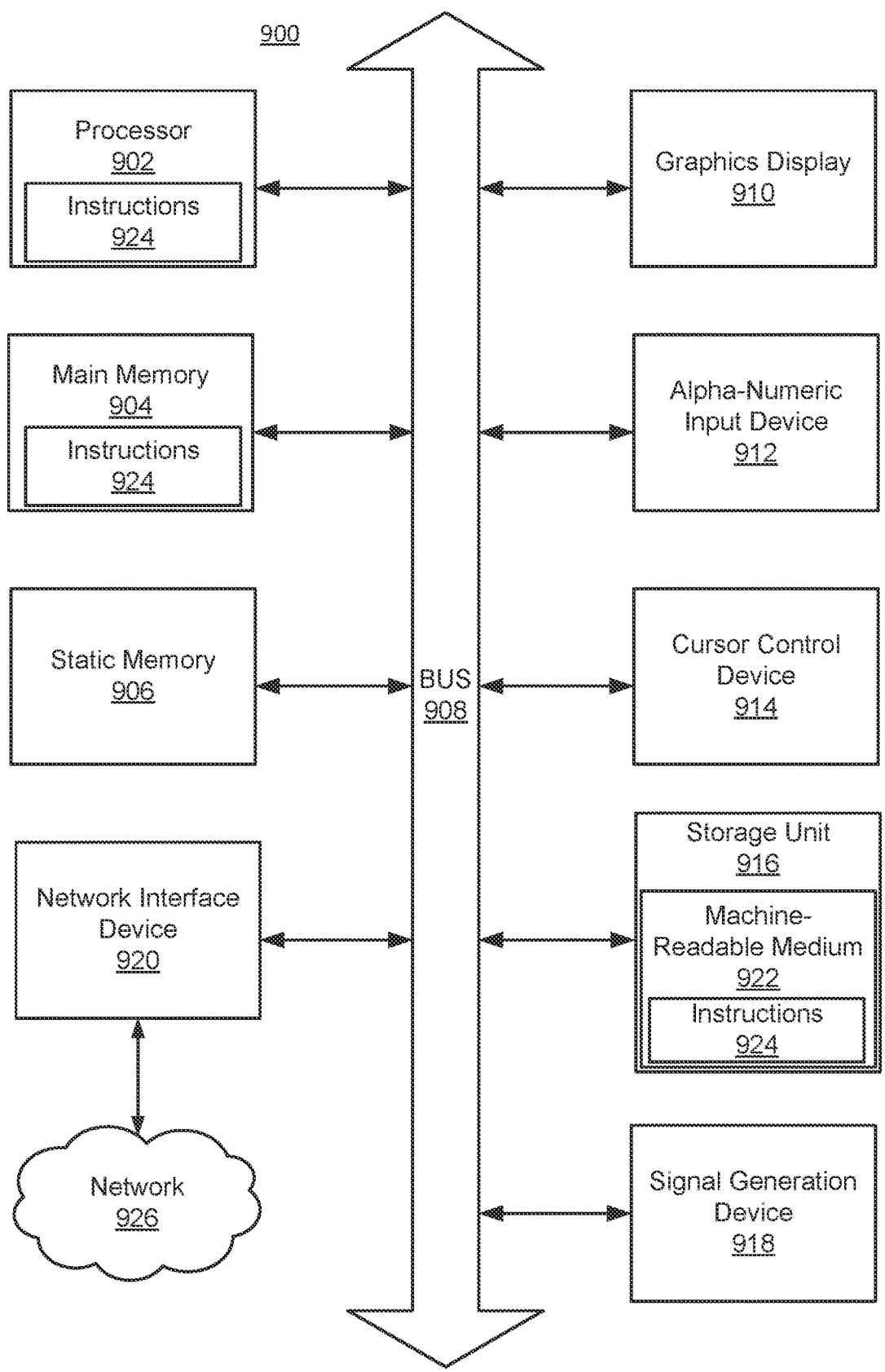
FIG. 9 is a block diagram illustrating components of an example machine able to read instructions from a machine-readable medium and execute the instructions in one or more processors, in accordance with an embodiment.

FIG. 9 is a block diagram illustrating components of an example machine able to read instructions from a machine-readable medium and execute them in one or more processors (or controllers). Specifically, FIG. 9 shows a diagrammatic representation of gateway system 130 in the example form of a computer system 900. The computer system 900 can be used to execute instructions 924 (e.g., program code or software) for causing the machine to perform any one or more of the methodologies (or processes) described herein. In alternative embodiments, the machine operates as a standalone device or a connected (e.g., networked) device that connects to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a smartphone, an internet of things (IoT) appliance, a network router, switch or bridge, or any machine capable of executing instructions 924 (sequential or otherwise) that specify actions to be taken by that machine. Further, while only a single machine is illustrated, the term "machine" shall also be taken to include any collection of machines that individually or jointly execute instructions 924 to perform any one or more of the methodologies discussed herein.

The example computer system 900 includes one or more processing units (generally processor 902). The processor 902 is, for example, a central processing unit (CPU), a graphics processing unit (GPU), a digital signal processor (DSP), a controller, a state machine, one or more application specific integrated circuits (ASICs), one or more radio-frequency integrated circuits (RFICs), or any combination of these. The computer system 900 also includes a main memory 904. The computer system may include a storage unit 916. The processor 902, memory 904, and the storage unit 916 communicate via a bus 908.

In addition, the computer system 900 can include a static memory 906, a graphics display 910 (e.g., to drive a plasma display panel (PDP), a liquid crystal display (LCD), or a projector). The computer system 900 may also include alphanumeric input device 912 (e.g., a keyboard), a cursor control device 914 (e.g., a mouse, a trackball, a joystick, a motion sensor, or other pointing instrument), a signal generation device 918 (e.g., a speaker), and a network interface device 920, which also are configured to communicate via the bus 908. In some embodiments, the computer system 900 may include cell phone or smartphone hardware, such as a camera, motion sensor, accelerometer, scanner (or QR code reader), global positioning system (GPS) functionalities and geolocation abilities, near field communication, etc.

The storage unit 916 includes a machine-readable medium 922 on which is stored instructions 924 (e.g., software) embodying any one or more of the methodologies or functions described herein. For example, the instructions 924 may include instructions for implementing the functionalities of the binding module 260, the design module 280 and/or the client interfacing module 290. The instructions 924 may also reside, completely or at least partially, within the main memory 904 or within the processor 902 (e.g., within a processor's cache memory) during execution thereof by the computer system 900, the main memory 904 and the processor 902 also constituting machine-readable media. The instructions 924 may be transmitted or received over a network 926 via the network interface device 920.

While machine-readable medium 922 is shown in an example embodiment to be a single medium, the term "machine-readable medium" should be taken to include a single medium or multiple media (e.g., a centralized or distributed database, or associated caches and servers) able to store the instructions 924. The term "machine-readable medium" shall also be taken to include any medium that is capable of storing instructions 924 for execution by the machine and that cause the machine to perform any one or more of the methodologies disclosed herein. The term "machine-readable medium" includes, but not be limited to, data repositories in the form of solid-state memories, optical media, and magnetic media.

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by one or more computer processors for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A computer-implemented method comprising:
   accessing a graph comprising a hierarchical set of nodes each representing a binding of a set of bindings and associated with a component property of a real-world physical component;
   receiving a request to generate a graphic user interface populated with a view associated with the set of bindings;
   determining an order to load the set of bindings to account for a startup lag caused by loading bindings and dependencies in the hierarchical structure such that each dependent binding is loaded only after each binding on which the dependent binding depends has produced valid data; and
   populating the graphic user interface with the view by loading the set of bindings into the view based on the determined order.

2. The computer-implemented method of claim 1, wherein the graph is generated by traversing the hierarchical set of nodes to identify the set of bindings.

3. The computer-implemented method of claim 2, wherein nodes of the graph are generated based on each identified binding while traversing the hierarchical set of nodes.

4. The computer-implemented method of claim 2, wherein each edge of the graph is directional indicating a direction of dependency between the nodes coupled to the edge, and wherein determining the order to load the set of bindings comprises:
   identifying within the graph a first set of nodes with no outgoing edges;
   identifying a second set of nodes that are directly connected to the first set of nodes; and
   loading the first set of nodes before loading the second set of nodes.

5. The computer-implemented method of claim 2, further comprising:
   removing a cycle from the graph, wherein the cycle is not associated with an originating node.

6. The computer-implemented method of claim 1, wherein a binding is a tag binding, a property binding, an expression binding, an expression structure binding, a query binding, a tag history binding, or an HTTP (Hypertext Transfer Protocol) binding.

7. The computer-implemented method of claim 1, wherein a data source associated with the data model is one of: a programmable logic controller, an Application Programming Interface, a function, an expression, a database, and a subtree of a second property tree.

8. The computer-implemented method of claim 1, wherein loading the set of bindings is further based on loading time associated with each of the set of bindings such that a dependent binding is loaded an amount of time equal to the loading time after a binding upon which the dependent binding depends is loaded.

9. A non-transitory computer-readable storage medium comprising memory with executable computer instructions encoded thereon that, when executed by one or more processors, cause the one or more processors to perform operations, the instructions comprising instructions to:
   accessing a graph comprising a hierarchical set of nodes each representing a binding of a set of bindings and associated with a component property of a real-world physical component;
   receiving a request to generate a graphic user interface populated with a view associated with the set of bindings;
   determining an order to load the set of bindings to account for a startup lag caused by loading bindings and dependencies in the hierarchical structure such that each dependent binding is loaded only after each binding on which the dependent binding depends has produced valid data; and
   populating the graphic user interface with the view by loading the set of bindings into the view based on the determined order.

10. The non-transitory computer-readable storage medium of claim 9, wherein the graph is generated by traversing the hierarchical set of nodes to identify the set of bindings.

11. The non-transitory computer-readable storage medium of claim 9, wherein nodes of the graph are generated based on each identified binding while traversing the hierarchical set of nodes.

12. The non-transitory computer-readable storage medium of claim 9, wherein each edge of the graph is directional indicating a direction of dependency between the nodes coupled to the edge, and wherein determining the order to load the set of bindings comprises:
   identifying within the graph a first set of nodes with no outgoing edges;
   identifying a second set of nodes that are directly connected to the first set of nodes; and
   loading the first set of nodes before loading the second set of nodes.

13. The non-transitory computer-readable storage medium of claim 9, wherein a data source associated with the data model is one of: a programmable logic controller, an Application Programming Interface, a function, an expression, a database, and a subtree of a second property tree.

14. The non-transitory computer-readable storage medium of claim 9, wherein loading the set of bindings is further based on loading time associated with each of the set of bindings such that a dependent binding is loaded an amount of time equal to the loading time after a binding upon which the dependent binding depends is loaded.

15. A computing system comprising:
   a processor; and
   a non-transitory computer-readable storage medium storing instructions for detecting and blocking a pop-up loop, the instructions when executed by the processor cause the processor to perform steps including:
      accessing a graph comprising a hierarchical set of nodes each representing a binding of a set of bindings and associated with a component property of a real-world physical component;
      receiving a request to generate a graphic user interface populated with a view associated with the set of bindings;
      determining an order to load the set of bindings to account for a startup lag caused by loading bindings and dependencies in the hierarchical structure such that each dependent binding is loaded only after each binding on which the dependent binding depends has produced valid data; and
   populating the graphic user interface with the view by loading the set of bindings into the view based on the determined order.

16. The computing system of claim 15, wherein the graph is generated by traversing the hierarchical set of nodes to identify the set of bindings.

17. The computing system of claim 15, wherein nodes of the graph are generated based on each identified binding while traversing the hierarchical set of nodes.

18. The computing system of claim 15, wherein each edge of the graph is directional indicating a direction of dependency between the nodes coupled to the edge, and wherein determining the order to load the set of bindings comprises:
   identifying within the graph a first set of nodes with no outgoing edges;
   identifying a second set of nodes that are directly connected to the first set of nodes; and
   loading the first set of nodes before loading the second set of nodes.

19. The computing system of claim 15, wherein a binding is a tag binding, a property binding, an expression binding, an expression structure binding, a query binding, a tag history binding, or an HTTP (Hypertext Transfer Protocol) binding.

20. The computing system of claim 15, wherein a data source associated with the data model is one of: a programmable logic controller, an Application Programming Interface, a function, an expression, a database, and a subtree of a second property tree.

* * * * *